US008860678B2

(12) United States Patent
Hsu et al.

(10) Patent No.: US 8,860,678 B2
(45) Date of Patent: Oct. 14, 2014

(54) COMPUTER SYSTEM WITH TOUCH SCREEN AND GESTURE PROCESSING METHOD THEREOF

(75) Inventors: Wen-Shiu Hsu, Taipei (TW); Hung-Yi Lin, Taipei (TW); Meng-Ju Lu, Taipei (TW)

(73) Assignee: Asustek Computer Inc., Taipei (TW)

( * ) Notice: Subject to any disclaimer, the term of this patent is extended or adjusted under 35 U.S.C. 154(b) by 188 days.

(21) Appl. No.: 13/477,174

(22) Filed: May 22, 2012

(65) Prior Publication Data

US 2012/0299852 A1 Nov. 29, 2012

(30) Foreign Application Priority Data

May 27, 2011 (TW) ............................. 100118704 A

(51) Int. Cl.
*G06F 3/041* (2006.01)
*G06F 3/0488* (2013.01)

(52) U.S. Cl.
CPC .................................. *G06F 3/04883* (2013.01)
USPC ........................................ 345/173; 178/18.01

(58) Field of Classification Search
USPC ..................... 345/173–179; 178/18.01–18.09
See application file for complete search history.

(56) References Cited

U.S. PATENT DOCUMENTS

| | | | |
|---|---|---|---|
| 7,956,847 B2 | 6/2011 | Christie | |
| 8,686,962 B2 | 4/2014 | Christie | |
| 2008/0165141 A1 | 7/2008 | Christie | |
| 2008/0168403 A1 | 7/2008 | Westerman et al. | |
| 2010/0141590 A1 | 6/2010 | Markiewicz et al. | |
| 2011/0239155 A1 | 9/2011 | Christie | |

FOREIGN PATENT DOCUMENTS

| | | |
|---|---|---|
| TW | M347623 | 12/2008 |
| TW | 200925952 A | 6/2009 |

OTHER PUBLICATIONS

Taiwan Intellectual Property Office, "Office Action", May 27, 2014.

*Primary Examiner* — Premal Patel
(74) *Attorney, Agent, or Firm* — WPAT, PC; Justin King

(57) ABSTRACT

A computer system with a touch screen and a gesture processing method are provided. The computer system has a gesture hook unit for receiving a first type gesture event from a first gesture engine and a plurality of second type gesture events from a second gesture engine. A top-layer image is adjusted according to the first type gesture event and the second type gesture. In such way, an image shown on a workspace of an application program is smoothly changed in response to a gesture of a user.

9 Claims, 7 Drawing Sheets

COMPUTER SYSTEM WITH TOUCH SCREEN AND GESTURE PROCESSING METHOD THEREOF

This application claims the benefit of Taiwan Patent Application No. 100118704, filed May 27, 2011, the subject matter of which is incorporated herein by reference.

FIELD OF THE INVENTION

The disclosure relates to a computer system, and more particularly to a computer system with a touch screen. The disclosure also relates to a gesture processing method for the computer system.

BACKGROUND OF THE INVENTION

With the progress of science and technology, the operating system (OS) of the current computer system is able to support the touch screen technology. Recently, the touch screen gradually replaces the conventional mouse to control the computer system. By making a gesture on the touch screen with one or more fingers, an action of zooming, rotating or translating a target item may be correspondingly performed.

FIGS. 1A and 1B schematically illustrate an action of zooming in a target item of the computer system in response to a gesture on the touch screen. A toolbar 110 of the operating system is shown on the touch screen 100 of the computer system. The toolbar 110 has several user interfaces, for example including a start button 112 and a network status icon 114. In addition, a window of an application program 120 is shown on the touch screen 100, and a first image 160*a* is shown on a workspace of the application program 120. The workspace is an area of the window of the application program 120 for allowing the user to perform the action of zooming, rotating or translating the first image 160*a*.

In a case that the user wants to zoom in the first image 160*a* of the workspace, two touch points 150 and 155 are placed on the workspace of the application program 120 shown on the touch screen 100, then the two touch points 150 and 155 are moved away from each other, so that the distance between two touch points 150 and 155 is increased (see FIG. 1A). After the two touch points 150 and 155 are departed from the touch screen 100, a second image 160*b* is shown on the workspace of the application program window 120 (see FIG. 1B). Therefore, the first image 160*a* is enlarged as the second image 160*b* by the application program 120 in response to the gesture of the user.

Whereas, in a case that the user wants to zoom out the first image 160*a*, the two touch points 150 and 155 are moved toward each other, so that the distance between two touch points 150 and 155 is decreased. After the two touch points 150 and 155 are departed from the touch screen 100, the purpose of zooming out the first image 160*a* is achieved. Similarly the action of rotating or translating the first image 160*a* may be performed by changing the relationship between the two touch points in response to a specified gesture of the user. Moreover, the specified gesture of the user is defined by the manufacturer of the computer system.

The computer system has a touch screen signal processing device for recognizing the gesture of the user according to the touch points of the user. By the touch screen signal processing device, the computer system may execute a corresponding command in response to the gesture of the user.

FIG. 2 is a schematic functional block diagram illustrating the architecture of a touch screen signal processing device used in the conventional computer system with a touch screen. As shown in FIG. 2, the touch screen signal processing device comprises a touch unit 300, a gesture engine 304, and an application program 310. The touch unit 300 comprises a touch screen 301 and a driver 302. The gesture engine 304 is used for receiving a position signal from the touch unit 300. In response to the position signal, the gesture engine 304 issues a gesture event to the application program 310 through an application program interface (API) 320. According to the gesture event, the application program 310 executes a corresponding action.

In a case that multi-touch points are generated on the touch screen 301, the driver 302 generates a corresponding position signal. The position signal may be a coordinate signal. Moreover, according to a change of the position signal, the gesture engine 304 recognizes a gesture of the user and thus issues a corresponding gesture event to the application program 310.

Although most of the gesture-based application programs can process the gesture event, these application programs fail to smoothly perform the zooming action, the rotating action or the translating action. Under this circumstance, the effect of the gesture is discontinuously expressed. Therefore, user may experience the screen lag during the operation, since response of the application program is slow.

FIG. 3A schematically illustrates the trajectories of two touch points during a zooming-in action is performed in the conventional computer system. During the zooming-in action is performed, a first position signal 610 and a second position signal 620 corresponding to the trajectories of two touch points are continuously transmitted from the touch unit 300 to the gesture engine 304. As shown in FIG. 3A, the two touch points appear at the time spot t0, and the two touch points disappear after the time spot t3.

For realizing the type and function of the gesture of the user, the gesture engine 304 recognizes the position signals during the time interval T1 between the time spot t0 and the time spot t1, thereby generating a first zoom gesture event to the application program 310 at the time spot t1. After the first zoom gesture event is generated, the identical type of zoom gesture event is periodically generated in every time interval T2. That is, after the first zoom gesture event is generated, the gesture engine 304 generates a second zoom gesture event to the application program 310 at the time spot t2. Moreover, after the second zoom gesture event is generated, the gesture engine 304 generates a third zoom gesture event to the application program 310 at the time spot t3. According to the first zoom gesture event, the second zoom gesture event and the third zoom gesture event, the content of the workspace is correspondingly enlarged.

Experiments demonstrate that the time interval T1 is about 1.3 second and the time interval T2 is about 0.7 second. For most gesture-based application programs, the effect of the gesture is discontinuously expressed when the number of the received zoom gesture events or the accumulated change amount of the zoom gesture event match a specified value. Consequently, from the time spot t0 to the time spot t3, the user may feel that the image is not smoothly and continuously enlarged (see FIG. 3B).

SUMMARY OF THE INVENTION

An embodiment of the disclosure provides a gesture processing method for use with a touch screen. A gesture processing method for use with a touch screen, the gesture processing method comprising steps of: receiving a position signal; transmitting the position signal to a first gesture engine and a second gesture engine; generating a top-layer image; determining whether a first type gesture event is generated, wherein if the first type gesture event has not been generated, the top-layer image is adjusted according to a plurality of second type gesture events, wherein when the first type gesture event is generated, the top-layer image is adjusted according to the first type gesture event; generating a gesture end event when the first type gesture event is no longer generated; and removing the top-layer image.

Another embodiment of the present invention provides a computer system with a touch screen. The computers system includes a touch screen, a first gesture engine, a second gesture engine, an application program, and a gesture hook unit. The touch screen generates a position signal in response to a touch point. The first gesture engine generates a first type gesture event in response to the position signal. The second gesture engine generates a plurality of second type gesture events in response to the position signal. The application program has a workspace. The gesture hook unit is used for capturing a content of the workspace, thereby generating a top-layer image. The gesture hook unit further judges whether the first type gesture event is generated. If the first type gesture event has not been generated, the top-layer image is adjusted according to the second type gesture events. When the first type gesture event is generated, the top-layer image is adjusted according to the first type gesture event. When the first type gesture event is no longer generated, a gesture end event is generated and the top-layer image is removed.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the disclosure will become more readily apparent to those ordinarily skilled in the art after reviewing the following detailed description and accompanying drawings, in which.

DETAILED DESCRIPTION OF PREFERRED EMBODIMENTS

As previously described, for most gesture-based application programs, the action of zooming, rotating or translating the image is discontinuously expressed when the number of the received zoom gesture events or the accumulated change amount of the zoom gesture event match a specified value.

For eliminating the drawbacks encountered from the prior art, the disclosure provides a gesture processing method for a computer system. The touch screen signal processing device of the computer system has a gesture hook unit. For performing the zooming, the rotating action or the translating action, the image of the application program is captured by the gesture hook to be used as a top-layer image. Consequently, the content of the workspace of the application program is covered by the top-layer image. According to the gesture of the user, the action of zooming in, zooming out, rotating or translating the top-layer image can be performed in real time. After the touch points of the user are departed from the touch screen and the action of zooming, rotating or translating the content of the workspace is performed by the application program, the top-layer image is removed by the gesture hook unit. Consequently, the content of the actual workspace in response to the gesture is shown.

Figure 1A:
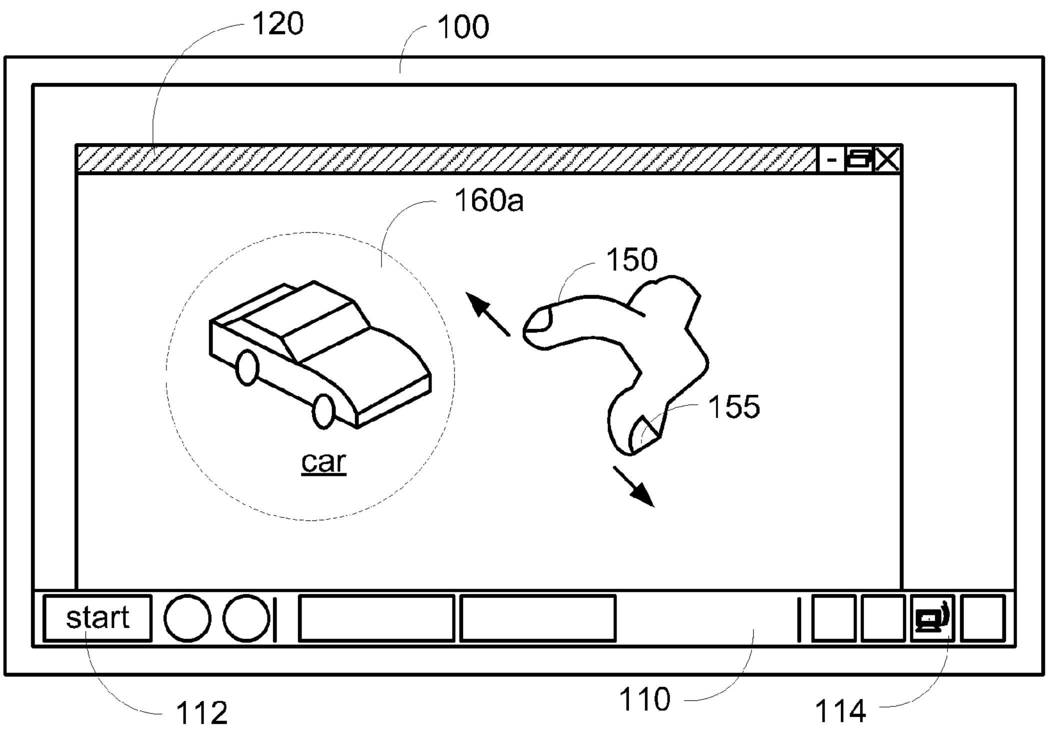
FIGS. 1A and 1B (prior art) schematically illustrate an action of zooming in a target item of the computer system in response to a gesture on the touch screen.
Figure 1B:
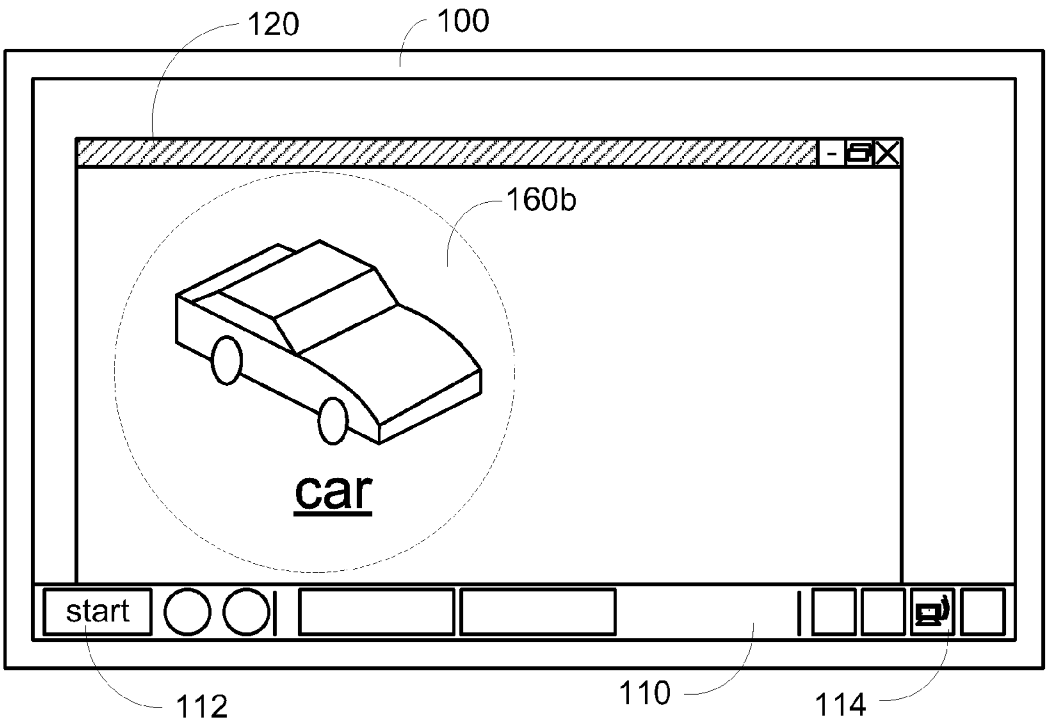
Figure 2:
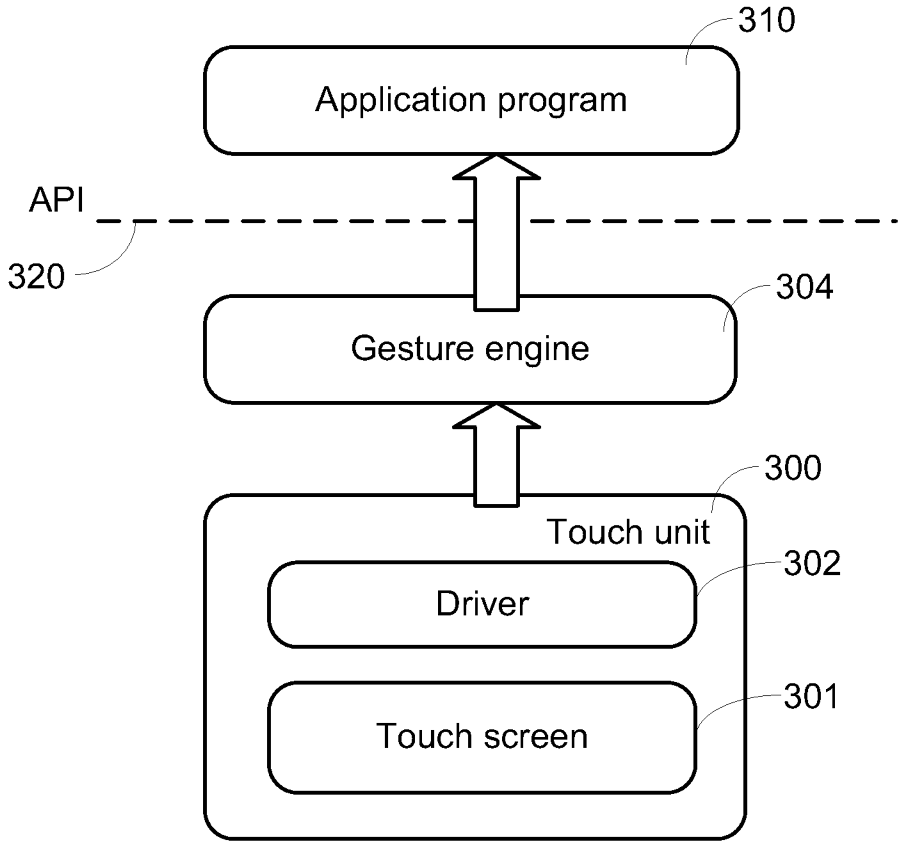
FIG. 2 (prior art) is a schematic functional block diagram illustrating the architecture of a touch screen signal processing device used in the conventional computer system with a touch screen.
Figure 3A:
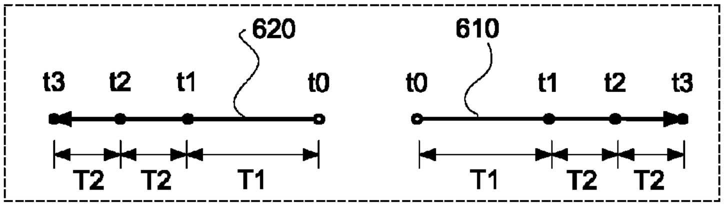
FIG. 3A (prior art) schematically illustrates the trajectories of two touch points during a zooming-in action is performed in the conventional computer system.
Figure 3B:
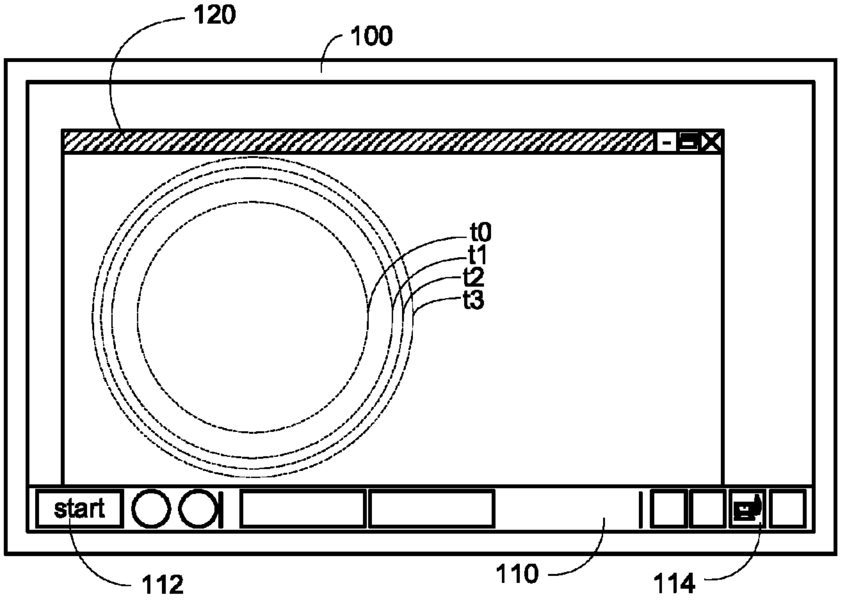
FIG. 3B (prior art) schematically illustrates the image shown on the workspace during the zooming-in action is performed in the conventional computer system.
Figure 4:
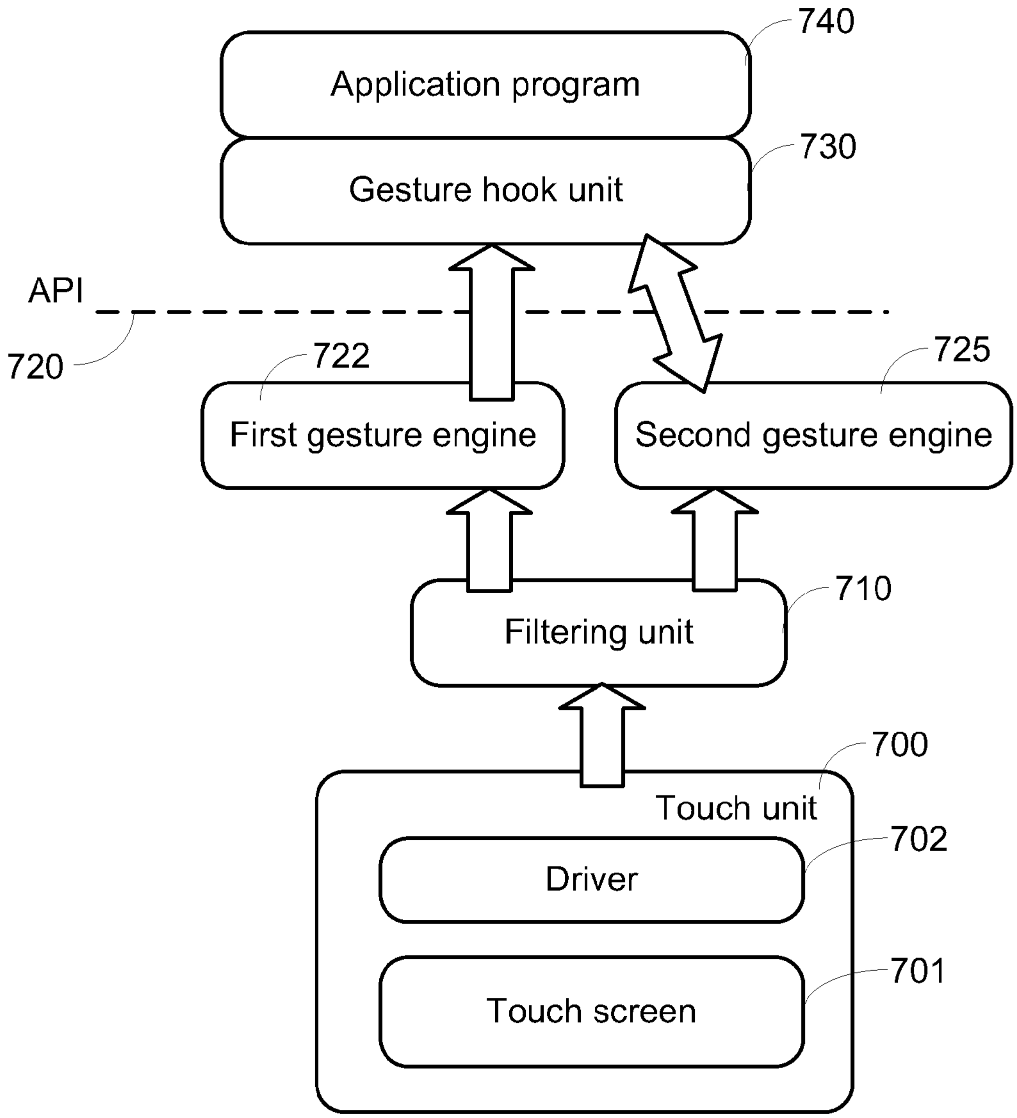
FIG. 4 is a schematic functional block diagram illustrating the architecture of a touch screen signal processing device used in a computer system according to an embodiment of the disclosure.

FIG. 4 is a schematic functional block diagram illustrating the architecture of a touch screen signal processing device used in a computer system according to an embodiment of the disclosure. The touch screen signal processing device comprises a touch unit 700, a filtering unit 710, a first gesture engine 722, a second gesture engine 725, a gesture hook unit 730, and an application unit 740. The touch unit 700 comprises a touch screen 701 and a driver 702.

The filtering unit 710 is used for receiving a position signal from the touch unit 700 and transmitting the position signal to the first gesture engine 722 and the second gesture engine 725. The first gesture engine 722 is provided by the operating system. Consequently, the first gesture engine 722 generates a first type gesture event after a relatively longer time interval. The second gesture engine 725 can quickly recognize the position signal and generate a second type gesture event in response to the position signal. The first type gesture event generated by the first gesture engine 722 and the second type gesture event generated by the second gesture engine 725 are transmitted to the gesture hook unit 730 through an application program interface (API) 720.

In this embodiment, for performing the zooming action, the rotating action or the translating action, the image of the application program is captured by the gesture hook unit 730 to be used as a top-layer image. In addition, the content of the workspace of the application program 740 is covered by the top-layer image.

Since the first one of the first type gesture events is generated by the first gesture engine 722 after a relatively longer time interval T1, the second gesture engine 725 is designed to quickly recognize the position signal and successively issue many second type gesture events to the gesture hook unit 730.

That is, before the first one of the first type gesture events is generated by the first gesture engine 722, the action of zooming, rotating or translating the top-layer image is performed by the gesture hook unit 730 according to the second type gesture events generated by the second gesture engine 725. As a consequence, the user may feel that the top-layer image is smoothly moved in response to the gesture of the user.

When the first one of the first type gesture events from the first gesture engine 722 is received by the gesture hook unit 730, the gesture hook unit 730 informs the second gesture engine 725 to stop generating the second type gesture events. Afterwards, the action of zooming, rotating or translating the top-layer image is performed by the gesture hook unit 730 according to many first type gesture events generated by the first gesture engine 722. As a consequence, the user may also feel that the top-layer image is smoothly moved in response to the gesture of the user.

After the touch points are departed from the touch screen, the first gesture engine 722 generates the last one of the first type gesture events to the gesture hook unit 730. The last one of the first type gesture events is also defined as a gesture end event. When the gesture end event is received by the gesture hook unit 730, a single action of zooming, rotating or translating the content of the actual workspace is performed by the application program 740 according to the change amount of the gesture from the beginning to the end.

After the action of zooming, rotating or translating the content of the workspace is performed by the application program 740 in response to the gesture end event, the top-layer image is removed by the gesture hook unit 730. Under this circumstance, the content of the actual workspace is shown. However, since the speed of removing the top-layer image is too fast to be sensed by the user, the user may still feel the smooth motion of the gesture.

Figure 5A:
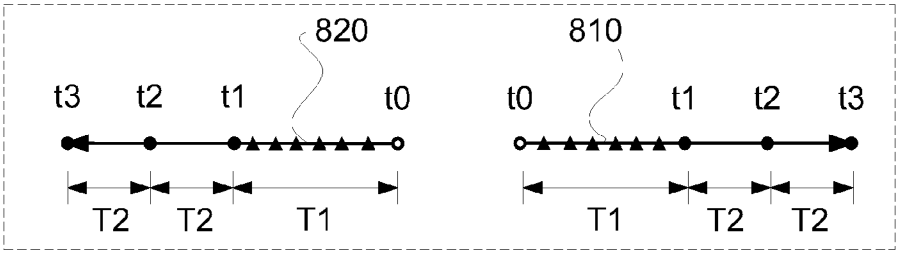
FIG. 5A schematically illustrates the trajectories of two touch points during a zooming-in action is performed in the computer system of the disclosure.
Figure 5B:
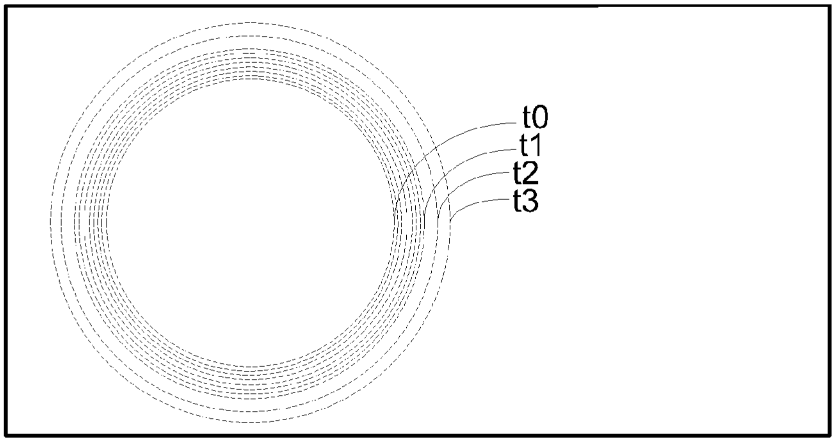
FIG. 5B schematically illustrates a top-layer image of the application program captured by the gesture hook unit during the zooming-in action is performed in the computer system of the disclosure.
Figure 5C:
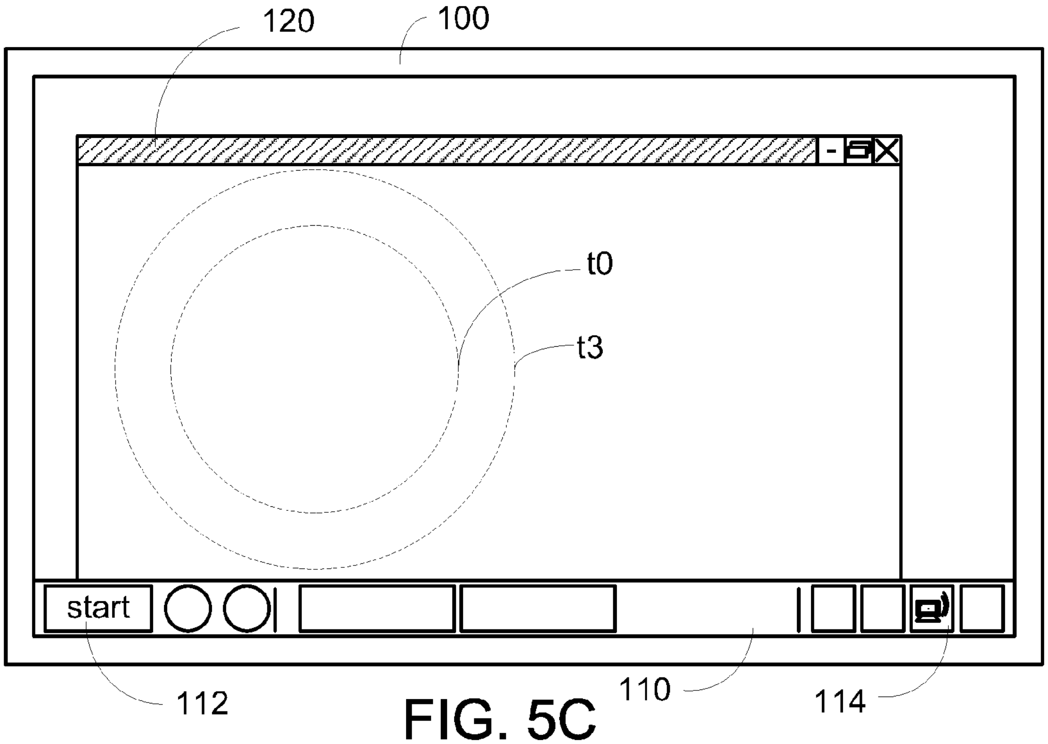
FIG. 5C schematically illustrates the image shown on the actual workspace of the application program during the zooming-in action is performed in the computer system of the disclosure.

Please refer to FIGS. 5A, 5B and 5C. FIG. 5A schematically illustrates the trajectories of two touch points during a zooming-in action is performed in the computer system of the disclosure. As shown in FIG. 5A, two touch points appear at the time spot t0, and the two touch points disappear after the time spot t3.

Moreover, during a zooming-in action is performed, a first position signal 810 and a second position signal 820 corresponding to the trajectories of two touch points are successively transmitted from the touch unit 800 to the filtering unit 710. The first position signal 810 and the second position signal 820 are then transmitted from the filtering unit 710 to the second gesture engine 725.

Since the first gesture engine 722 is provided by the operating system, the first type gesture event (as is indicated by the circular dots) is generated by the first gesture engine 722 after a relatively longer time interval. As shown in FIG. 5A, the first gesture engine 722 sequentially generates the first type gesture events to the gesture hook unit 730 at the time spots t1, t2 and t3. Moreover, since the type and function of the gesture can be quickly recognized by the second gesture engine 725, the second gesture engine 725 may generate many second type gesture events (as are indicated by the triangular dots) to the gesture hook unit 730 during the time interval between the time spot t0 and the time spot t1.

FIG. 5B schematically illustrates a top-layer image of the application program captured by the gesture hook unit during the zooming-in action is performed in the computer system of the disclosure.

During the time interval between the time spot t0 and the time spot t1, the image is changed in response to the changes of the second type gesture events, which are generated by the second gesture engine 725 and received by the gesture hook unit 730. Since the second type gesture events are quickly generated, the response rate of capturing the top-layer image and zooming in the image will be largely enhanced.

At the time spot t1, the first gesture engine 722 starts to generate a first type gesture event. At the same time, the gesture hook unit 730 informs the second gesture engine 725 to stop generating the second type gesture events. During the time interval between the time spot t1 and the time spot t3, the image is changed in response to the changes of the first type gesture events, which are generated by the first gesture engine 722 and received by the gesture hook unit 730.

Consequently, as shown in FIG. 5B, the action of zooming in the top-layer image is more smooth. Moreover, during the process of zooming in the top-layer image, since the user can only view the top-layer image overlying the workspace (see FIG. 5B), the user still feels the smooth motion of the gesture.

FIG. 5C schematically illustrates the image shown on the actual workspace of the application program 740 during the zooming-in action is performed in the computer system of the present invention. It is noted that the content of the actual workspace is invisible because the content of the actual workspace is covered by the top-layer image.

In this embodiment, the second type gesture events and the first type gesture events are intercepted by the gesture hook unit 730, and thus the top-layer image is adjusted by the gesture hook unit 730 according to the second type gesture events and the first type gesture events. In other words, during the zooming-in action is performed, the first type gesture events and the second type gesture events fail to be received by the application program 740. Consequently, before the time spot t3, the content of the actual workspace is not changed.

At the time spot t3, the gesture hook unit 730 confirms that the touch points of the user disappear. Consequently, the gesture hook unit 730 generates a gesture end event to the application program 740. In response to the gesture end event, the application program 740 will directly zoom in the content of the actual workspace.

After the gesture hook unit 730 confirms that the content of the actual workspace has been adjusted by the application program 740, the gesture hook unit 730 will remove the top-layer image. Consequently, the content of the actual workspace has enhanced image quality and resolution. Meanwhile, the zooming-in action is completed.

Figure 6:
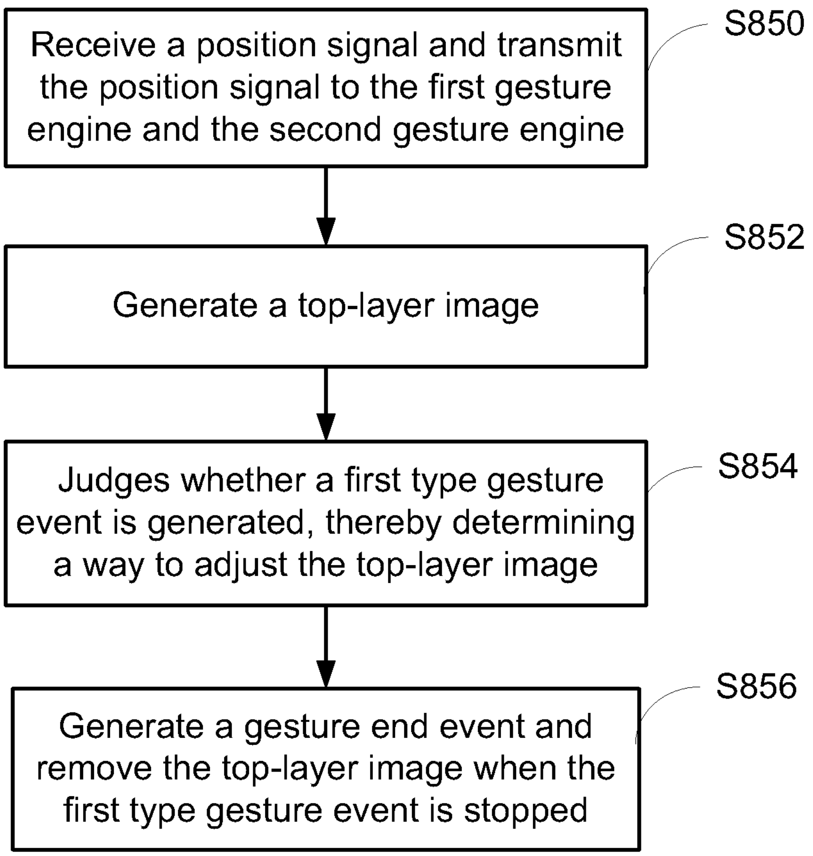
FIG. 6 is a flowchart illustrating a gesture processing method according to an embodiment of the disclosure.

In the above embodiment, the gesture processing method of the present invention is illustrated by referring to the zooming-in action. Nevertheless, the gesture processing method of the present invention may also applied to the zooming-out action, the rotating action, the translating action or the like, FIG. 6 is a flowchart illustrating a gesture processing method according to an embodiment of the disclosure.

A position signal is received by the filtering unit 710, and then transmitted to the first gesture engine 722 and the second gesture engine 725 (Step S850). A top-layer image is generated by the gesture hook unit 730 (Step S852).

Then, the gesture hook unit 730 determines whether a first type gesture event is generated, thereby to adjust the top-layer image (Step S854). Before the first type gesture event is generated, the top-layer image is adjusted by the gesture hook unit 730 according to many second type gesture events. Whereas, after the first type gesture event is generated, the top-layer image is adjusted by the gesture hook unit 730 according to the first type gesture event.

When the first type gesture event is no longer generated, the gesture hook unit 730 generates a gesture end event and removes the top-layer image (Step S856).

Figure 7:
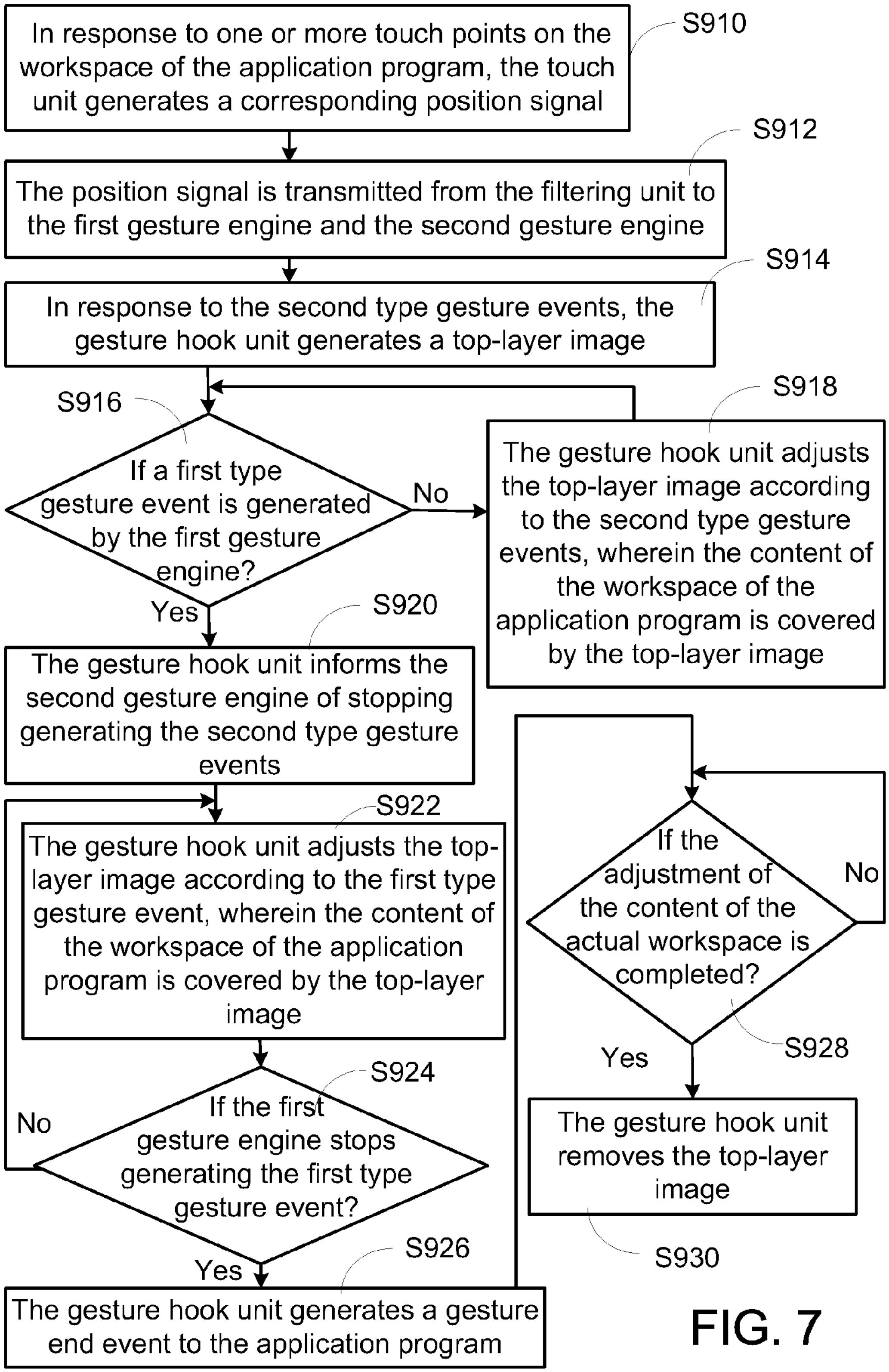
FIG. 7 is a flowchart illustrating the detailed steps of a gesture processing method according to an embodiment of the disclosure.

FIG. 7 is a flowchart illustrating the detailed steps of a gesture processing method according to an embodiment of the disclosure. When the one or more touch points are generated on the workspace of the application program, the touch unit generates a corresponding position signal (Step S910). Generally, one touch point is generated during performing the translating action, and two touch points are generated during performing the zooming-in action, the zooming-out action or the rotating action The position signal is transmitted from the filtering unit to the first gesture engine and the second gesture engine (Step S912). The first gesture engine and the second gesture engine can recognize the gesture of the user according to the position signal. Since the first gesture engine is provided by the operating system, the first type gesture event is generated by the first gesture engine after a relatively longer time interval. Whereas, the second type gesture events can be quickly generated by the second gesture engine. Consequently, when the second type gesture events are received by the gesture hook unit, the gesture hook unit generates a top-layer image (Step S914).

The gesture hook unit determines whether a first type gesture event generated by the first gesture engine is received (Step S916). If the first type gesture event has been not received by the gesture hook unit, the gesture hook unit adjusts the top-layer image according to the second type gesture events, wherein the content of the workspace of the application program is covered by the top-layer image (Step S918).

When the first type gesture event is received by the gesture hook unit, the gesture hook unit informs the second gesture engine to stop generating the second type gesture events (Step S920). The gesture hook unit adjusts the top-layer image according to the first type gesture event, wherein the content of the workspace of the application program is covered by the top-layer image (Step S922).

The gesture hook unit determines whether the first gesture engine stops generating the first type gesture event (Step S924). If the first gesture engine still generates the first type gesture event, the step S922 is repeatedly done. When the gesture hook unit confirms that the first gesture engine stops generating the first type gesture event, the gesture hook unit generates a gesture end event to the application program (Step S926). Consequently, the content of the actual workspace is adjusted by the application program according to the change amount of the gesture from the beginning to the end.

The gesture hook unit determines whether the adjustment of the content of the actual workspace is completed (Step S928). If the adjustment of the content of the actual workspace is not completed, the step S928 is repeatedly done. When the gesture hook unit confirms that the adjustment of the content of the actual workspace is completed, the gesture hook unit removes the top-layer image (Step S930). Meanwhile, the gesture processing method is finished.

From the above description, the disclosure provides a gesture processing method. Before the first type gesture event is generated by the first gesture engine, the top-layer image is adjusted in response to the gesture of the user. Therefore, the user can feel the smooth movement of the image in response to the gesture of the user, the response performance of the computer system is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gesture processing method for use with a touch screen, the gesture processing method comprising steps of:

receiving a position signal;

transmitting the position signal to a first gesture engine and a second gesture engine;

generating a top-layer image, wherein a content of a workspace is covered by the top-layer image;

determining whether a first type gesture event is generated, wherein if the first type gesture event has not been generated, the top-layer image is adjusted according to a plurality of second type gesture events which are successively generated before the first type gesture event, wherein when the first type gesture event is generated, the top-layer image is adjusted according to the first type gesture event;

generating a gesture end event and accordingly adjusting the content of the workspace when the first type gesture event is no longer generated; and removing the top-layer image after the workspace is adjusted.

2. The gesture processing method as claimed in claim 1, wherein each of the first type gesture event and the second type gesture events includes a zoom gesture event, a rotation gesture event or a translation gesture event.

3. The gesture processing method as claimed in claim 1, wherein the first type gesture event is generated by the first gesture engine, and the second type gesture events are generated by the second gesture engine.

4. The gesture processing method as claimed in claim 1, wherein the top-layer image is generated by capturing the content of the workspace shown on the touch screen.

5. The gesture processing method as claimed in claim 1, wherein the gesture end event is generated when the first gesture engine stops generating the first type gesture event.

6. A computer system with a touch screen, the computers system comprising:

a touch screen for generating a position signal in response to a touch point;

a first gesture engine for generating a first type gesture event in response to the position signal;

a second gesture engine for successively generating a plurality of second type gesture events in response to the position signal before the first type gesture event is generated;

an application program having a workspace; and a gesture hook unit for capturing a content of the workspace, thereby generating a top-layer image to cover a content of the workspace, wherein the gesture hook unit further judges whether the first type gesture event is generated, wherein if the first type gesture event has not been generated, the top-layer image is adjusted according to the second type gesture events, wherein when the first type gesture event is generated, the top-layer image is adjusted according to the first type gesture event, wherein when the first type gesture event is no longer generated, a gesture end event is generated and the workspace is accordingly adjusted before the top-layer image is removed.

7. The computer system as claimed in claim 6, wherein each of the first type gesture event and the second type gesture events includes a zoom gesture event, a rotation gesture event or a translation gesture event.

8. The computer system as claimed in claim 6, further comprising a filtering unit for receiving the position signal from the touch unit and transmitting the position signal to the first gesture engine and the second gesture engine.

9. The computer system as claimed in claim 6, wherein the gesture end event is generated when the first gesture engine stops generating the first type gesture event.

* * * * *